United States Patent [19]

Matsuda

[11] Patent Number: 4,964,047
[45] Date of Patent: Oct. 16, 1990

[54] ANTI-SKID BRAKE CONTROL SYSTEM FOR AUTOMOTIVE BRAKE SYSTEM WITH PROJECTION OF VEHICULAR SPEED REPRESENTATIVE DATA ON THE BASIS OF LONGITUDINAL ACCELERATION EXERTED ON VEHICLE BODY

[75] Inventor: Toshiro Matsuda, Kanagawa, Japan

[73] Assignee: Nissan Motor Company Limited, Yokohama, Japan

[21] Appl. No.: 239,807

[22] Filed: Sep. 2, 1988

[30] Foreign Application Priority Data

Sep. 4, 1987 [JP] Japan .................. 62-220457

[51] Int. Cl.$^5$ .............................................. B60T 8/32
[52] U.S. Cl. ........................ 364/426.02; 364/565; 324/162; 303/103; 303/105
[58] Field of Search ............ 364/426.02, 565, 566; 303/95, 97, 103, 105, 109, 110; 180/197; 324/160–162

[56] References Cited

U.S. PATENT DOCUMENTS

| | | | |
|---|---|---|---|
| 4,089,564 | 5/1978 | Öberg | 303/109 |
| 4,358,164 | 11/1982 | Bleckmann et al. | 364/426.02 |
| 4,430,714 | 2/1984 | Matsuda et al. | 303/105 |
| 4,569,560 | 2/1986 | Kubo | 303/116 |
| 4,597,052 | 6/1986 | Matsuda | 364/550 |
| 4,633,716 | 5/1987 | Kubo | 364/426.02 |
| 4,656,588 | 4/1987 | Kubo | 364/426.02 |
| 4,660,146 | 4/1987 | Kubo | 364/426.02 |
| 4,663,715 | 5/1987 | Kubo | 364/426.02 |
| 4,665,491 | 5/1987 | Kubo | 364/565 |
| 4,669,045 | 5/1987 | Kubo | 364/426.02 |
| 4,669,046 | 5/1987 | Kubo | 364/426.02 |
| 4,674,049 | 6/1987 | Kubo | 364/426.02 |
| 4,674,050 | 6/1987 | Kubo | 364/426.02 |
| 4,675,819 | 6/1987 | Fennel | 303/105 |
| 4,676,146 | 7/1987 | Kubo | 364/426.02 |
| 4,680,713 | 7/1987 | Kubo | 364/426.02 |
| 4,680,714 | 7/1987 | Kubo | 364/426.02 |
| 4,682,295 | 7/1987 | Kubo | 364/426.02 |
| 4,704,684 | 11/1987 | Kubo | 364/426.02 |
| 4,718,013 | 1/1988 | Kubo | 364/426.02 |
| 4,787,682 | 11/1988 | Muto | 303/109 |
| 4,818,037 | 4/1989 | McEnnan | 303/103 |

*Primary Examiner*—Gary Chin
*Attorney, Agent, or Firm*—Foley & Lardner, Schwartz, Jeffery, Schwaab, Mack, Blumenthal & Evans

[57] ABSTRACT

An anti-skid brake control system employs a technique for correcting a longitudinally based vehicular speed variation gradient by a road slop dependent correction value. The road slop dependent correction value is derived on the basis of an assumed road slop condition which is assumed on the basis of magnitude of increase of the braking pressure.

18 Claims, 7 Drawing Sheets

ANTI-SKID BRAKE CONTROL SYSTEM FOR AUTOMOTIVE BRAKE SYSTEM WITH PROJECTION OF VEHICULAR SPEED REPRESENTATIVE DATA ON THE BASIS OF LONGITUDINAL ACCELERATION EXERTED ON VEHICLE BODY

BACKGROUND OF THE INVENTION

1. Field of the Invention

The present invention relates generally to an anti-skid brake control system for an automotive brake system. More specifically, the invention relates to an anti-skid brake control system including a technique for deriving a projected vehicular speed on the basis of longitudinal acceleration to be exerted on the vehicular body.

2. Description of the Background Art

It is well known that vehicular braking performance becomes optimum when wheel slippage becomes a certain value, e.g. 10% to 20%. Therefore, as is well known, anti-skid or anti-lock brake control is generally performed for maintaining the wheel slippage within a predetermined optimal range. For this, wheel slippage is monitored for controlling operational modes of a vehicular braking system for increasing braking pressure in APPLICATION mode, holding braking pressure constant in HOLD mode and decreasing braking pressure in RELEASE mode. In the vehicular anti-skid brake control, the APPLICATION mode is selected in normal operational condition for allowing linearly decelerating the vehicle according to increasing of the braking pressure. Anti-skid control is initiated upon detection of wheel deceleration during braking operation, in a greater magnitude than a preset deceleration threshold to switch operational mode of the brake system from APPLICATION mode to HOLD mode. Therefore, at the initial stage of an anti-skid brake control cycle, the braking pressure is held constant at an increased pressure at which ;he wheel deceleration increased across the wheel deceleration threshold is obtained, in HOLD mode. Because of the increased pressure in this HOLD mode, wheel speed further decelerates at a greater rate than deceleration of the vehicle speed. Therefore, wheel slippage which represents a ratio of difference of the vehicle speed and the wheel speed versus the vehicle speed, becomes greater than a target speed which represents the optimal wheel speed for obtaining optimum vehicular braking characteristics. When the wheel slippage becomes greater than a wheel slippage threshold and thus the wheel speed becomes decreased across the target speed, operational mode of the brake system is again switched into the RELEASE mode for decreasing the braking pressure for resuming the wheel speed toward the target speed. By this, the wheel speed resumes across the target speed. Therefore, wheel acceleration increases across a preset acceleration threshold. Then, the mode is again switched into the HOLD mode. Because of decreased braking pressure, the wheel speed overshoots to increase across the vehicle speed and then decelerated to the vehicle speed. Accordingly, the wheel acceleration again decreases across the acceleration threshold. Then, mode is switched to APPLICATION mode again.

In the anti-skid control set forth above, it becomes necessary to monitor the vehicle speed for deriving the wheel slippage. It is possible to directly measure the vehicle speed by means of an appropriate sensor, such as a doppler sensor. However, such sensor is unacceptably expensive and therefor is not practical for use in the anti-skid control system in view of the cost. Therefore, it is usual way for monitoring the vehicle speed in anti-skid control to latch a wheel speed upon initiation of anti-skid control as vehicle speed representing data, because upon initiation of the anti-skid control where the wheel deceleration increased across the wheel deceleration threshold, is approximately coincident with the vehicle speed. This vehicle speed representing data will be hereafter referred to as "projected speed". Based on the latched value, a vehicle speed represented data is projected utilizing a given vehicle deceleration indicative gradient which can be derived in various ways.

In another approach, the projected vehicular speed representative data has been derived on the basis of a longitudinal acceleration exerted on the vehicular body. In case that the longitudinal acceleration is used as a parameter for deriving the projected vehicular speed representative data, slop on the road can influence for monitoring longitudinal acceleration as will be naturally appreciated. For instance, the vehicle is in hill-climbing, the forward acceleration can be smaller than that of actual value due to influence of backward component of gravity force. On the other hand, when the vehicle is in down-hill driving condition, the forward acceleration can be greater than that of the actual value due to influence of the forward component of gravity force. In order to avoid influence of such gravity force in measurement of longitudinal acceleration for improving accuracy in derivation of the projected vehicular speed representative data, Japanese Patent Second (examined) Publication (Tokko) Showa 48-27710 proposes correction of the measured longitudinal acceleration value with a correction value which is derived on the basis of a road slop angle indicative data obtained immediately before initiation of vehicular braking operation.

Such prior proposal is not satisfactory because it cannot follow slop angle variation during vehicular braking operation. For instance, when the braking operation is performed on the flat road condition and the vehicle then enters into slopped road, correction value derived with respect to flat road may not satisfactorily compensate the gravity force component.

SUMMARY OF THE INVENTION

Therefore, it is an object of the present invention to provide an anti-skid brake control system employing technologies for deriving a projected vehicular speed representative data based on a longitudinal acceleration on a vehicular body with successfully avoiding influence of road slop.

In order to accomplish aforementioned and other objects, an anti-skid brake control system, according to the present invention, employs a technique for correcting a longitudinally based vehicular speed variation gradient by a road slop dependent correction value. The road slop dependent correction value is derived on the basis of an assumed road slop condition which is assumed on the basis of magnitude of increase of the braking pressure.

According to one aspect of the invention, an anti-skid brake control system for an automotive brake system comprises a hydraulic brake circuit having means for building up braking fluid pressure according to operational magnitude of a manually operable braking member, means, associated with a vehicular wheel, for generating braking force to decelerating the vehicular wheel, a pressure adjusting means, disposed within the hydraulic circuit, for adjusting pressure of a working fluid to be delivered to the braking force generating means, the pressure adjusting means being operable at least in a first mode for increasing braking pressure in the braking force generating means and in a second mode for decreasing the braking pressure, a first sensor means for monitoring rotation speed of the vehicular wheel to produce a wheel speed indicative sensor signal representative of the rotation speed of the vehicular wheel, a second sensor means for monitoring longitudinal acceleration exerted on a vehicular body for producing a longitudinal acceleration indicative sensor signal, first means for detecting a predetermined vehicular braking condition satisfying a predetermined anti-skid brake control condition for initiating anti-skid control operation, second means for latching a first wheel speed indicative value corresponding to instantaneous wheel speed indicative sensor signal values at a predetermined timing in each skid cycle and arithmetically deriving a vehicular deceleration gradient indicative data on the basis of the longitudinal acceleration indicative sensor signal for deriving a gradient data of vehicular speed variation during vehicular deceleration on the basis thereof, third means for deriving a projected vehicular speed representing data based on the latched wheel speed indicative value and utilizing the gradient data, and fourth means for controlling the pressure adjusting means between the first and second modes for maintaining the rotation speed of the vehicular wheel in a predetermined optimal relationship with the projected vehicular speed representative data.

According to another aspect of the invention, an anti-skid brake control system for an automotive brake system comprises a hydraulic brake circuit having a means for building up braking fluid pressure according to operational magnitude of a manually operable braking member, first braking force generating means, associated with a first vehicular wheel, for generating braking force to decelerating the first vehicular wheel, and second braking force generating means, associated with a second vehicular wheel, for generating braking force to decelerating the second vehicular wheel, a first pressure adjusting means, disposed within the hydraulic circuit, for adjusting pressure of a working fluid to be delivered to the first braking force generating means, the pressure adjusting means being operable at least in a first mode for increasing braking pressure in the first braking force generating means and in a second mode for decreasing the braking pressure, a second pressure adjusting means, disposed within the hydraulic circuit, for adjusting pressure of a working fluid to be delivered to the second braking force generating means, the pressure adjusting means being operable at least in a first mode for increasing braking pressure in the braking force generating means and in a second mode for decreasing the second braking pressure, a first sensor means for monitoring rotation speed of the first vehicular wheel to produce a first sensor signal representative of the rotation speed of the vehicular wheel, a second sensor means for monitoring rotation speed of the second vehicular wheel to produce a second sensor signal representative of the rotation speed of the vehicular wheel, means for comparing the first and second sensor signal values for selecting one having greater value as common wheel speed indicative data, a third sensor means for monitoring longitudinal acceleration exerted on a vehicular body for producing a longitudinal acceleration indicative sensor signal, first means for detecting a predetermined vehicular braking condition satisfying a predetermined anti-skid brake control condition for initiating anti-skid control operation, second means for latching a wheel speed indicative data corresponding to instantaneous common wheel speed indicative sensor signal values at a predetermined timing in each skid cycle and arithmetically deriving a vehicular deceleration gradient indicative data on the basis of the longitudinal acceleration indicative sensor signal for deriving a gradient data of vehicular speed variation during vehicular deceleration on the basis thereof, third means for deriving a projected vehicular speed representing data based on the latched wheel speed indicative data and utilizing the gradient data, and fourth means for controlling the pressure adjusting means between the first and second modes for maintaining the rotation speed of the vehicular wheel in a predetermined optimal relationship with the projected vehicular speed representative data.

According to a further aspect of the invention, a system for projecting a vehicular speed representative data on the basis of a wheel speed, comprises a first sensor means for monitoring rotation speed of the vehicular wheel to produce a wheel speed indicative sensor signal representative of the rotation speed of the vehicular wheel, a second sensor means for monitoring longitudinal acceleration exerted on a vehicular body for producing a longitudinal acceleration indicative sensor signal, first means for latching a first wheel speed indicative value corresponding to instantaneous wheel speed indicative sensor signal values at a predetermined timing and arithmetically deriving a vehicular deceleration gradient indicative data on the basis of the longitudinal acceleration indicative sensor signal for deriving a gradient data of vehicular speed variation during vehicular deceleration on the basis thereof, and third means for deriving a projected vehicular speed representing data based on the latched wheel speed indicative value and utilizing the gradient data.

Preferably, the second means derives the deceleration gradient indicative data by adding a given magnitude of offset value. Furthermore, the second means includes an integrator means for integrating a given acceleration gradient indicative data while vehicle is in acceleration and the deceleration gradient indicative data while vehicle is in deceleration, for deriving a projected vehicular speed indicative data by adding the integrated value with the latched wheel speed indicative data.

In the later case, the second means includes a comparator means comparing the wheel speed indicative sensor signal value with a reference value which is derived on the basis of the projected vehicular speed indicative data for discriminating vehicular condition between acceleration state and deceleration state to selectively input the acceleration gradient indicative data and the deceleration indicative data. It is further preferred that the comparator means establishes the reference value with a first greater value component derived by adding a given value to the projected vehicular speed indicative data, which first greater value component serves as acceleration state criterion to make judgement that the vehicle is in acceleration state when the wheel speed indicative sensor signal value is greater than the first greater value component, and a second smaller value component derived by subtracting the given value from the projected vehicular speed indicative data, which second smaller value component serves as a deceleration state criterion to make judgement that the vehicle is in deceleration state when the wheel speed indicative sensor signal value is smaller than the second smaller value component, so as to define a deadband around the projected vehicular speed indicative data, in which deadband, the gradient indicative data is maintained at zero.

Practically, the acceleration gradient indicative data comprises a first value to be used while an anti-skid control is not active and a second value greater than the first value and to be used while the anti-skid control is active.

DESCRIPTION OF THE PREFERRED EMBODIMENT

Figure 1A:
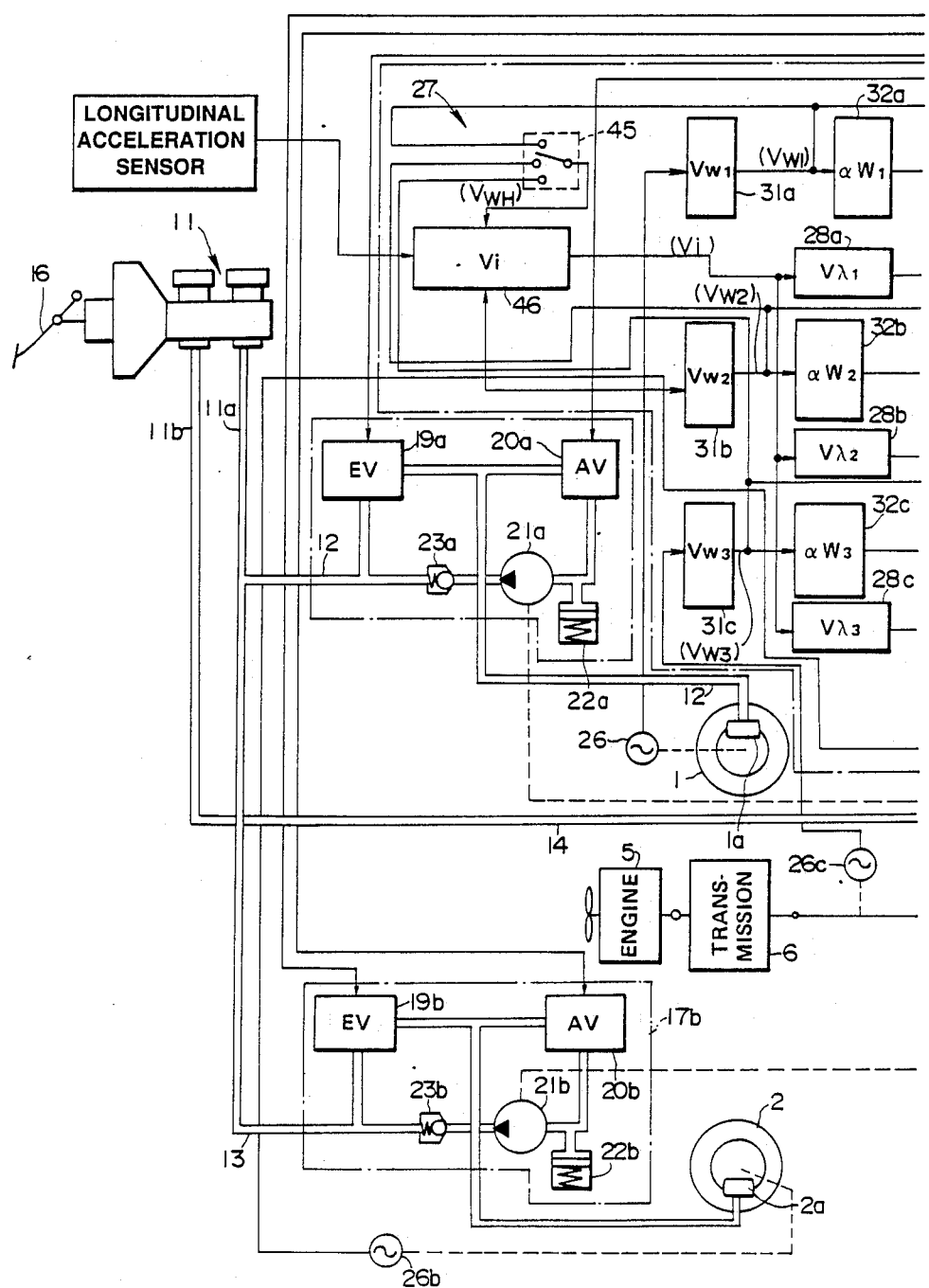
FIGS. 1(A) and 1(B) are block diagram of an overall anti-skid brake control system, to which the preferred embodiment of a vehicle speed representing value derivation system according to the invention, is applied.
Figure 1B:
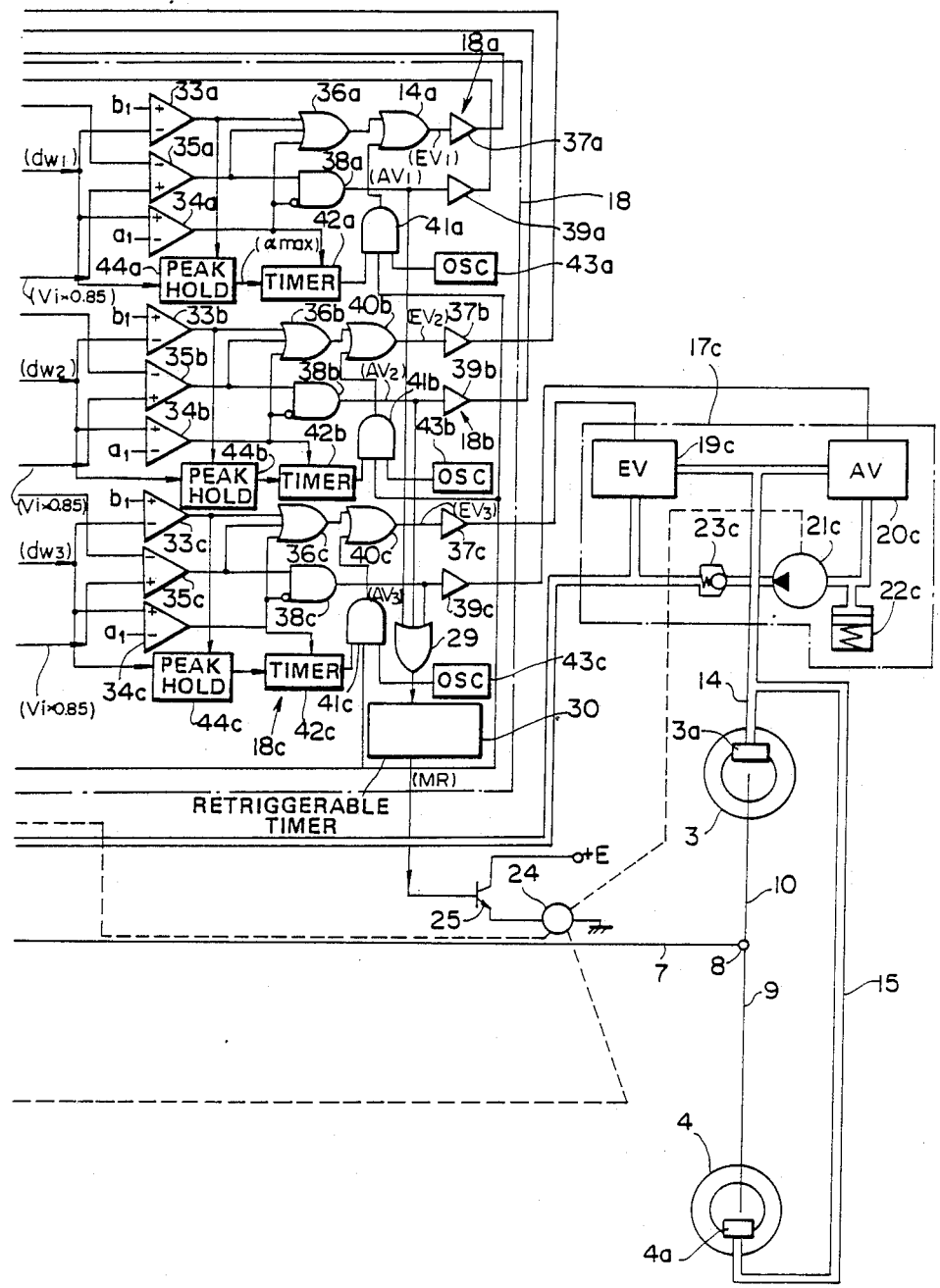

Referring now to the drawings, particularly to FIG. 1, the preferred embodiment of an anti-skid brake control system, according to the present invention, is designed for controlling braking pressure to be exerted on respective front and rear vehicular wheels 1, 2, 3 and 4. Each of the front and rear wheels 1, 2, 3 and 4 are co-operated with wheel cylinders 1a, 2a, 3a and 4a so that the latter may apply braking pressure to respectively associated front and rear wheels. On the other hand, the rear wheels 3 and 4 are connected to an automotive engine 5 through a power train constituted by a transmission 6, a propeller shaft 7, a differential gear unit 8 and drive shafts 9 and 10.

In the shown embodiment, the anti-skid brake control system controls braking force to be exerted to each wheel cylinders for performing anti-skid brake control and whereby preventing the wheels from skidding. Though it is neglected from the discussion given herebelow, the shown embodiment of the control system may also operate to control engine output torque or driving torque distribution to the driven rear wheels 3 and 4 so as to prevent the wheels from causing wheelspin and to provide better tire/road traction. The engine output torque control or power distribution control may be performed by adjusting throttle valve angular position by means of a throttle valve servo systems, such as that disclosed in British Patent First Publications Nos. 2,154,763 and 2,154,765. The disclosure of the above-identified British Patent First Publications are herein incorporated by reference for the sake of disclosure. Furthermore, traction control systems for adjusting driving torque to be exerted on the driven wheels of the vehicle have been disclosed in the co-pending U.S. patent application Ser. No. 903,474, filed on Sept. 4, 1986, assigned to the common assignee to the present invention. The disclosure of the above-identified co-pending U.S. patent application is also herein incorporated by reference for the sake of disclosure.

In the shown embodiment, a hydraulic brake system for applying braking fluid pressure to respective wheel cylinders 1a, 2a, 3a and 4a includes separated two hydraulic circuits 12, 13 and 14 which are, in turn, connected to a master cylinder 11 via pressure lines 11a and 11b. One of the hydraulic circuit 12 which is connected to the pressure line 11a, connects one of outlet ports of a master cylinder 11 to front-right wheel cylinder 1a which is associated with the front-right wheel 1. Similarly, the hydraulic circuit 12 which is also connected to the pressure line 11a, is connected to the front-left wheel cylinder 2a of the front-left wheel 2. The other outlet port of the master cylinder 11 is connected to the rear-right wheel cylinder 3a, and through a branch circuit 15, to the rear-left wheel cylinder 4a. As is well known, the master cylinder 11 is mechanically coupled with a brake pedal 16 for building-up braking fluid pressure depending upon magnitude of depression of the brake pedal. The braking fluid pressure built up in the master cylinder 11 is distributed to respective wheel cylinders 1a, 2a, 3a and 4a through the circuits 12, 13, 14 and 15 for exerting braking force to respectively associated wheels 1, 2, 3 and 4.

Anti-skid brake control valves assemblies 17a, 17b and 17c are disposed in the circuits 12, 13 and 14. As will be seen from FIGS. 1(A), 1(B) and 1(C), the anti-skid brake control valve assembly 17c is positioned upstream of the junction between the circuits 14 and 15. Therefore, braking fluid pressure to be exerted to the rear wheel cylinders 3a and 4a is commonly controlled by means of the anti-skid brake control valve assembly 17c. On the other hand, the anti-skid brake control valves 17a and 17b are respectively disposed in the circuits 12 and 13 at the positions downstream of the junction of the circuits 12 and 13 and the pressure line 11a. Therefore, the valves 17a and 17b controls braking fluid pressures at associated one of the wheel cylinders 1a and 2a, independently of each other.

The anti-skid brake control valve assemblies 17a, 17b and 17c have mutually identical constructions to each other. Therefore, it would not be necessary to give detailed description of the constructions for the valve assemblies 17a, 17b and 17c, respectively. In order to avoid redundant recitation and avoiding confusion in understanding the invention, the construction of the anti-skid brake control valve assembly 17a will only be described herebelow. The constructions of the valve assemblies 17b and 17c should be understood as identical to that of the valve assembly 17a set out below.

The anti-skid brake control valve assembly 17a includes an inlet (EV) valve 19a, outlet (AV) valve 20a, a fluid pump 21a, accumulator 22a and one-way check valve 23a. The Ev valve 19a has an inlet port connected to the associated outlet port of the master cylinder 11 via the hydraulic circuit 12 and an outlet port connected to the front-right wheel cylinder 1a. On the other hand, the AV valve 20a has an inlet port connected to the wheel cylinder 1a and an outlet port connected to the accumulator 22a. The accumulator 22a is further connected to the hydraulic circuit 12 via the fluid pump 21a and the one-way check valve 23a for feeding back excessive fluid pressure therethrough. The fluid pump 23a is designed to draw the pressurized fluid in the associated wheel cylinder 1a to quickly reduce the braking pressure in the wheel cylinder while the anti-skid brake control is performed.

The EV valve 19a is controlled the valve position by an inlet control signal $EV_1$ from a control unit 18 between closed position and open position. Similarly, the AV valve 20a is controlled the valve position by an outlet control signal $AV_1$ from the control unit 18 between closed position and open position. Furthermore, the fluid pump 21a is connected to the control unit 18 to receive a pump drive signal MR to be controlled its operation between driving condition and resting condition.

In the preferred embodiment, the EV valve 19a is in the open position while the inlet control signal $EV_1$ is LOW level. On the other hand, the AV valve 20a is in the closed position while the outlet control signal $AV_1$ is LOW level. The anti-skid brake control valve assembly 17a is operable in APPLICATION mode, RELEASE mode and HOLD mode. In the APPLICATION mode, the inlet control signal $EV_1$ is held LOW to maintain the Ev valve 19a in open position. At the same time, the outlet control valve $AV_1$ is also held LOW to maintain the AV valve 20a in the closed position. Therefore, the outlet port of the master cylinder 11 is connected to the wheel cylinder 1a through the hydraulic circuit 12 and the Ev valve 19a. Therefore, the braking fluid pressure in the wheel cylinder 1a is increased proportionally to that built-up in the master cylinder. On the other hand, in the RELEASE mode, the inlet control signal $EV_1$ is switched into HIGH level to operate the EV valve 19a at the closed position. This shuts off the fluid communication between the outlet port of the master cylinder 11 and the wheel cylinder 1a therethrough. On the other hand, at this time, the outlet control signal $AV_1$ also becomes HIGH level to open the Av valve 20a. As a result, fluid communication between the wheel cylinder 1a and the accumulator 22a is established. At the same time, the pump drive signal MR turns into HIGH to drive the fluid pump 21a. Therefore, the fluid pressure in the accumulator 22a becomes lower than that in the wheel cylinder 1a. Therefore, the braking fluid in the wheel cylinder 1a is drawn into the pressure accumulator.

On the other hand, in the HOLD mode, the inlet control signal $EV_1$ is set HIGH level to close the EV valve 19a and the outlet control signal $AV_1$ is set LOW level to maintain the AV valve 20a at closed position. Therefore, the wheel cylinder 1a is blocked fluid communication from the master cylinder 11 and the accumulator 22a. Therefore, the fluid pressure in the wheel cylinder 1a is held constant. The relationship of the inlet and outlet control signals $EV_1$ and $AV_1$ and the pump drive signal MR will be clearly seen from the following table:

TABLE

|  | APPLICATION | RELEASE | HOLD |
| --- | --- | --- | --- |
| $EV_1$ | LOW | HIGH | HIGH |
| $AV_1$ | LOW | LOW | HIGH |

TABLE-continued

|  | APPLICATION | RELEASE | HOLD |
| --- | --- | --- | --- |
| MR | — | — | HIGH |

As set forth the pressure control valve assemblies 17b and 17c are of identical constructions and operations as that set forth above with respect to the pressure control valve assembly 17a. For the sake of illustration, each components in the pressure control valve assemblies 17b and 17c are identified the same reference numerals with corresponding suffixes (b, c).

The control unit 18 is connected to a wheel speed sensors 26a, 26b and 26c for receiving pulse signal having frequency proportional to the rotation speed of the associated wheels 1, 2, 3 and 4. In practice, each of the wheel speed sensors 26a and 26b comprises a sensor rotor adapted to rotate with the vehicle wheel and a sensor assembly fixedly secured to the shim portion of the knucle spindle. The sensor rotor is fixedly secured to a wheel hub for rotation with the vehicle wheel. The sensor rotor may be formed with a plurality of sensor teeth at regular angular intervals. The width of the teeth and the grooves therebetween are preferably equal to each other and define a unit angle of wheel rotation. The sensor assembly comprises a magnetic core aligned with north pole head the sensor rotor and south pole distal from the sensor rotor. A metal element with a smaller diameter section is attached to the end of the magnetic core near the sensor rotor. The free end of the metal element faces the sensor teeth. An electromagnetic coil encircles the smaller diameter section of of the metal element. The electromagnetic coil is adapted to detect variation in the magnetic field generated by the magnetic core to produce an alternating-current sensor signal. Namely, the metal element and the magnetic core form a kind of proximity switch which adjusts the magnitude of the magnetic field depending upon the distance between the free end of the metal element and the sensor rotor surface. Thus, the intensity of the magnetic field fluctuates in relation to the passage of the sensor teeth and accordingly in relation to the angular velocity of the wheel.

Such wheel speed sensor has been disclosed in U.S. Pat. No. 4,597,052, issued on June 24, 1986, for example. The disclosure of the U.S. Pat. No. 4,597,052 is herein incorporated by reference for the sake of disclosure.

On the other hand, the wheel speed sensor 26c is associated with the propeller shaft 7 for producing a frequency signal having a frequency proportional to the rotation speed of the propeller shaft. The practical construction of the propeller shaft associated wheel speed sensor 26c is similar to that of the wheel speed sensors 26a and 26b. Therefore, detailed discussion about the construction of the wheel speed sensor 26c will not be given in view of simplification of the disclosure.

The control unit 18 has a controller circuit sections 18a, 18b and 18c for outputting inlet and outlet control signals. The controller circuit section 18a is designed to produce the inlet and outlet control signals $EV_1$ and $AV_1$ for the pressure control valve assembly 17a on the basis of the wheel speed indicative pulse signal from the wheel speed sensor 26a and representative of the rotation speed of the right-front wheel 1. Similarly, the controller circuit section 18b is designed to produce the inlet and outlet control signals $EV_2$ and $AV_2$ for the pressure control valve assembly 17b on the basis of the wheel speed indicative pulse signal output from the wheel speed sensor 26b and representative of the rotation speed of the left-front wheel 2. The controller circuit section 18c is designed to produce the inlet and outlet control signals $EV_3$ and $AV_3$ for the pressure control valve assembly 17c on the basis of the pulse signal from the wheel speed sensor 26c and representative of the rotation speed of the propeller shaft 7 which is, in other words, representative of an average rotation speed of the right-rear and left-rear wheels 3 and 4.

As the anti-skid brake control valves 17a, 17b and 17c, the controller circuit sections 18a, 18b and 18c are essentially the identical circuit constructions to each other. Therefore, the following discussion will be given only for the controller circuit section 18a. The corresponding circuit elements in the controller circuit sections 18b and 18c are represented by the same reference numerals with different suffixes which identifies the section to include the circuit elements.

As will be seen from FIG. 1, the controller circuit section 18a includes a wheel speed derivation circuit 31a and a wheel acceleration derivation circuit 32a. The wheel speed derivation circuit 31a receives the wheel speed indicative pulse signal from the wheel speed sensor 26a. Based on the frequency or pulse period of the wheel speed indicative pulse signal of the wheel speed sensor 26a and rotation radius of the right-front wheel, the wheel speed derivation circuit 31a derives an angular velocity of the right-front wheel and whereby derives an instantaneous wheel speed $Vw_1$ of the right-front wheel 1. The wheel speed derivation circuit 31a produces a wheel speed signal indicative of the derived wheel speed $Vw_1$. The wheel acceleration derivation circuit 32a receives the wheel speed signal from the wheel speed derivation circuit 31a. The wheel acceleration derivation circuit 32a derives wheel acceleration $\alpha w_1$ and produces a wheel acceleration indicative signal. Derivation of the wheel acceleration $\alpha w_1$ based on the variation of wheel speed $Vw_1$ indicated in the wheel speed signal, can be performed by differentiating the differences of the wheel speeds input at different and consecutive timing. Otherwise, the wheel acceleration may be derived directly from the wheel speed indicative pulse signal from the wheel speed sensor 26a in a manner disclosed in the aforementioned U.S. Pat. No. 4,597,052. Manners of derivation of the wheel speed $Vw_1$ and wheel acceleration $\alpha w_1$ have also been disclosed in:

U.S. Pat. No. 4,674,049, issued on June 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on April 21, 1987
U.S. Pat. No. 4,665,491, issued on May 12, 1987
U.S. Pat. No. 4,674,050, issued on June 16, 1987
U.S. Pat. No. 4,680,714, issued on July 12, 1987
U.S. Pat. No. 4,682,295, issued on July 21, 1887
U.S. Pat. No. 4,680,713, issued on July 14, 1987
U.S. Pat. No. 4,669,046, issued on May 26, 1987
U.S. Pat. No. 4,669,045, issued on May 26, 1987
U.S. Pat. No. 4,679,146, issued on July 7, 1987
U.S. Pat. No. 4,656,588, issued on April 7, 1987
U.S. Pat. No. 4,718,013, issued on Jan. 5, 1988
U.S. Pat. No. 4,569,560, issued on Feb. 11, 1986

All sixteen prior published U.S. Patents are issued to common applicant, i.e. Jun KUBO and commonly assigned to the common assignee to the present invention. The disclosures of the above-listed U.S. Patents are herein incorporated by reference for the sake of disclosure.

The wheel acceleration indicative signal of the wheel acceleration derivation circuit 32a is transmitted to a comparators 33a and 34a. In order to receive the wheel acceleration indicative signal, the comparator 33a is connected to the wheel acceleration derivation circuit 32a at an inverting input terminal. On the other hand, the comparator 34a is connected to the wheel acceleration derivation circuit 32a at a non-inverting input terminal thereof for receiving the wheel acceleration indicative signal therethrough. The wheel acceleration derivation circuit 32a is further connected to a peak detector circuit 44a which is designed for detecting a peak value of the wheel acceleration $\alpha w_1$ and holds the peak value.

The non-inverting input terminal of the comparator 33a is connected to a reference signal generator (not shown) for receiving therefrom a deceleration threshold indicative reference signal $-b$. The deceleration threshold indicative reference signal has a value representative of a predetermined deceleration threshold to be compared with the wheel acceleration value $\alpha w_1$. The comparator 33a normally outputs a LOW level comparator signal as long as the wheel acceleration $\alpha w_1$ is maintained higher than the deceleration threshold $-b$. The comparator 33a is responsive to the wheel acceleration $\alpha w_1$ dropping across the deceleration threshold $-b$ to output a HIGH level comparator signal.

The inverting input terminal of the comparator 34a is connected to a reference signal generator (not shown) which generates an acceleration threshold indicative reference signal having a value indicative of a predetermined wheel acceleration threshold $+a$. The comparator 34a thus compares the wheel acceleration $\alpha w_1$ as indicated in the wheel acceleration indicative signal of the wheel acceleration derivation circuit 32a with the wheel acceleration threshold $+a$. The comparator 34a generally outputs a LOW level comparator signal while the wheel acceleration $\alpha w_1$ is held lower than the wheel acceleration threshold $+a$. The comparator 34a produces a HIGH level comparator signal when the wheel acceleration $\alpha w_1$ rises across the wheel acceleration threshold.

Another comparator 35a is provided in the controller circuit section 18a. The comparator 35a has an inverting input terminal connected the wheel speed derivation circuit 31a for receiving therefrom the wheel speed signal. The comparator 35a also has a non-inverting input terminal connected to a target wheel speed derivation circuit 28a. The target wheel speed derivation circuit 28a generally derives a target wheel speed $V\lambda$ on the basis of a vehicle speed representing value Vi which is derived by a projected vehicle speed representing data derivation circuit 46 and a desired optimum wheel slippage for optimizing vehicular braking efficiency. As is well known, the vehicular braking efficiency becomes maximum in a wheel slippage range of 10% to 20%. In the practical embodiment, the target wheel slippage $\lambda$ is set at 15%. On the other hand, the vehicle speed representing value Vi is derived on the basis of an instantaneous wheel speed Vw at the beginning of each cycle of anti-skid brake control. The procedure of derivation of the vehicular speed representing value Vi discussed later. The target wheel speed $V\lambda$ is derived at a value of 85% of the vehicle speed representing value vi to indicate 15% of wheel slippage. The comparator 35a maintains a LOW level comparator signal while the wheel speed Vw is maintained higher than the target wheel speed Vλ. On the other hand, the comparator signal level of the comparator 35a turns HIGH when the wheel speed Vw drops across the target wheel speed Vλ.

The comparator signals of the comparators 33a and 34a and 35a are fed to input terminals of an OR gate 36a. The comparator 34a and 35a are also connected to an AND gate 38a to feed the comparator signals. The AND gate 38a has an inverting input terminal connected to the comparator 35i a to receive therefrom the comparator signal. The comparator 35a is further connected to a variable timer circuit 42a which will be described later.

The output terminal of the OR gate 36a is connected to one input terminal of an OR gate 40a. The other input terminal of the OR gate 40a is connected to an AND gate 41a. The AND gate 41a has one input terminal connected to the variable timer 42a. Another input terminal of the AND gate 41a is connected to an oscillator 43a which is designed to a given constant frequency of pulse signal. The other input terminal of the AND gate 41a is connected to a retriggerable timer circuit 30 which is designed for producing a pump drive signal MR for driving the fluid pump 21a, 21b and 21c by applying the pump drive signal MR to pump drive motor 24 through a switching transistor 25.

The OR gate 36a and the AND gate 41a are connected to an OR gate 40a which serves to output the inlet control signal EV$_1$. The output terminal of the OR gate 40a is connected to the Ev valve 19a of the anti-skid control valve assembly 17a via an amplifier 37a. On the other hand, the AND gate 38a serves to output the outlet control signal AV$_1$ to feed the outlet control signal to the Av valve 20a of the anti-skid control valve assembly 17a, via an amplifier 39a.

The projected vehicle speed representing data derivation circuit 46 is connected to the retriggerable timer circuit 30. The projected vehicle speed representing data derivation circuit 46 is designed to latch an instantaneous wheel speed vw as an initial vehicle speed representing value Vi$_1$ in response to the leading edge of a HIGH level timer signal serving as the pump drive signal MR. The projected vehicle speed representing value derivation circuit 46 derives the vehicle speed representing value Vi$_1$ on the basis of the initial vehicle speed representing value corresponding to the latched wheel speed value Vw$_1$ as set forth above.

The projected vehicle speed representing data derivation circuit 46 is also connected to a select-HIGH switch 45 having three terminals respectively connected to the wheel speed derivation circuits 31a, 31b and 31c. The select-HIgh switch 45 selects the greatest value among three wheel speed representing values Vw$_1$, Vw$_2$ and Vw$_3$ from respective wheel speed derivation circuits 31a, 31b and 31c and outputs the selected value as a common wheel speed representing data Vw. The common wheel speed representing data Vw is transferred to the projected vehicle speed representing data derivation circuit 46. Therefore, the projected vehicle speed representing data derivation circuit 46 derives the projected vehicular speed representing data Vi on the basis of the common wheel speed representing data Vw. The projected vehicular speed representing data Vi is further connected to a longitudinal acceleration sensor 47. The longitudinal acceleration sensor 47 is of generally known construction and monitors longitudinal acceleration exerted on the vehicular body to produce a longitudinal acceleration indicative sensor signal. In practice, the longitudinal acceleration sensor 47 produces a positive value longitudinal acceleration indicative sensor signal in response to the vehicular deceleration, value of which is variable depending upon the magnitude of deceleration, and a negative value longitudinal acceleration indicative sensor signal in response to the vehicular acceleration, value of which is variable depending upon magnitude of the vehicular acceleration. The projected vehicle speed representative data is delivered based on the common wheel speed representative data Vw and the longitudinal acceleration indicative sensor signal. The projected vehicle speed representative data Vi is fed to the target wheel speed derivation circuits 28a, 28b and 28c of respective controller circuit sections 18a, 18b and 18c.

Figure 2:
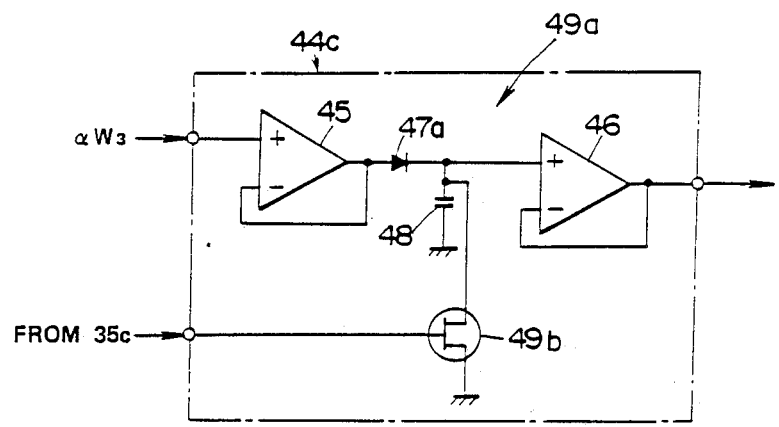
FIG. 2 is a circuit diagram of a peak detecting circuit in the wheel speed representing value derivation circuit of FIG. 1.

FIG. 2 shows detailed construction of the peak detector circuit 44a in the controller circuit section 18a set forth above. As will be seen from FIG. 2, the peak hold circuit 44a generally comprises a peak hold circuit 49a and an analog switch 49b. The peak hold circuit 48 is consisted of buffer amplifiers 45 and 46, a diode 47a and a capacitor 48. The buffer amplifier 45 of the peak hold circuit 49a is connected to the wheel acceleration derivation circuit 32a to receive therefrom the wheel acceleration indicative signal having a value representative of the wheel acceleration αw$_1$, at a non-inverted input terminal. An inverting input terminal of the buffer amplifier 45 is connected to an output terminal thereof for receiving the amplifier output as feedback input. The buffer amplifier outputs through its output terminal the amplifier output indicative of one of the inputs greater than the other. The amplifier output of the buffer amplifier 45 is fed to a charge/discharge circuit consisted of the diode 47a and the capacitor 48 and to a non-inverted input terminal of the other buffer amplifier 46. Similarly to the aforementioned buffer amplifier 45, an inverting input terminal of the buffer amplifier 46 is connected to an output terminal thereof to receive the amplifier output as feedback input.

Figure 3:
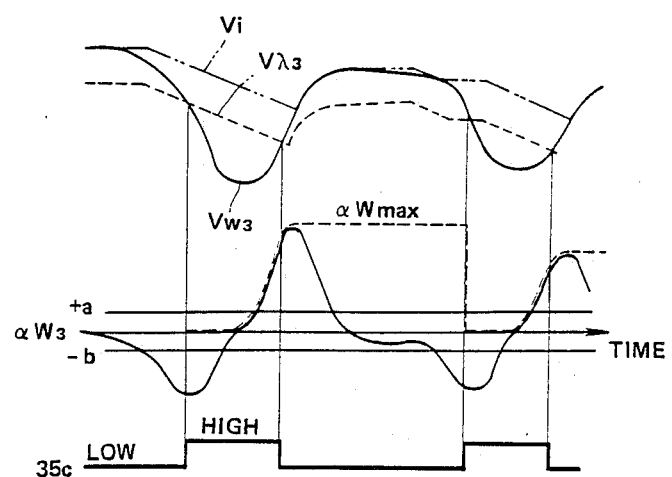
FIG. 3 is a chart showing manner of detection of the wheel speed peak to be carried out by the peak detecting circuit of FIG. 2.

The input side of the capacitor 48 is connected to the ground through the analog switch 49b. The analog switch 49b is connected to the comparator 33a. Therefore, the analog switch 49a becomes conductive at every leading edge of the HIGH level comparator signal from the comparator 33a for connecting the capacitor 48 to the ground. As a result, the potential in the capacitor 48 is discharged to the ground. Since the analog switch 49a is held conductive while the comparator signal from the comparator 33a is held at HIGH level, the potential in the capacitor 48 is maintained substantially zero during this period. The analog switch 49a becomes non-conductive in response to the trailing edge of the HIGH level comparator signal from the comparator 33a to block communication between the capacitor and the ground. As a result, the capacitor 48 start to be charged by the amplifier output from the buffer amplifier 45. The potential in the capacitor 48 is increased as increasing of the wheel acceleration αw$_1$ and held at the value corresponding to the peak value of the wheel acceleration, as shown in FIG. 3. Therefore, the amplifier output from the buffer amplifier 46 indicates peak value αw$_{max}$ of the wheel acceleration. As set forth above, since the potential in the capacitor 48 is discharged everytime the comparator signal rises to HIGH, the peak value αw$_{max}$ output from the peak detector circuit 44a represents the peak value of the wheel acceleration $\alpha w_1$ in each skid cycle, while the anti-skid brake control is performed.

Figure 4:
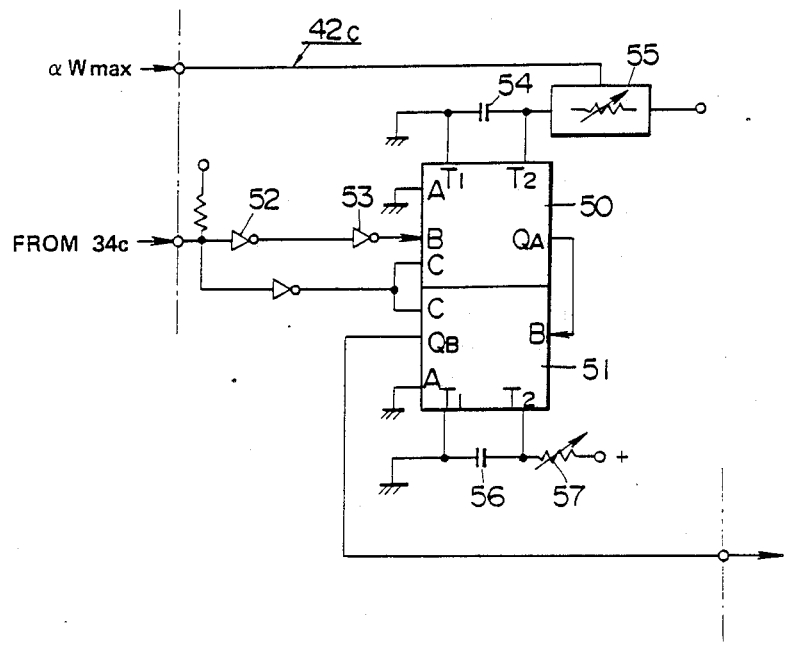
FIG. 4 is a circuit diagram of a variable timer circuit employed in the anti-skid brake control system of FIG. 1

FIG. 4 shows a detailed construction of the variable timer 42a. The variable timer 42a generally comprises a first timer 51 and a second timer 52. The first timer 50 has an input port B connected to the output terminal of the comparator 34a through an inverter 52 to receive therefrom the inverted comparator signal. The first timer 50 is designed to be triggered in response to the trailing edge of the HIGH level input at the input port B to output timer signal $Q_4$ for a given period of time $T_1$. The period $T_1$ to maintain the timer signal $Q_4$ is determined by a time constant derived from a capacity of a capacitor 54 and a resistance of a variable resistor 55 connected to the terminals $T_1$ and $T_2$ of the first timer 50. The variable resistor 55 is connected to the aforementioned peak detector circuit 44a to receive therefrom the amplifier output as a wheel acceleration peak indicative input. The resistance of the variable resistor 55 is adjusted depending upon the peak value $\alpha w_{max}$ as indicated in the wheel acceleration peak indicative signal. Therefore, the timer period of the first timer 50 is variable in proportion to the magnitude of the peak value $\alpha w_{max}$.

Figure 5:
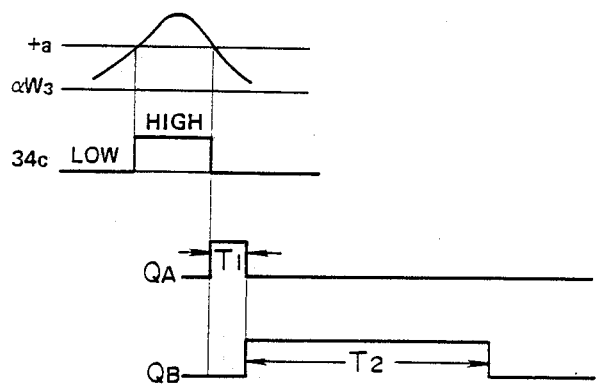
FIG. 5 is a chart showing operation of the variable timer circuit of FIG. 4.

The timer signal $Q_4$ of the first timer 50 is fed to a B input port of the second timer 51. The second timer 51 has a time constant circuit consisted of a capacitor 56 and a variable resistor 57 for providing a timer period $T_2$. The time constant of the time constant circuit of the capacitor 56 and the variable resistor 57 is set constant to set the timer period $T_2$ constant. Therefore, the second timer 51 is triggered by the trailing edge of the HIGH level input at the B input terminal. The second timer 51 as triggered outputs HIGH level timer signal for the timer period determined by the time constant of the time constant circuit of the capacitor 56 and the variable resistor 57, through $Q_B$ output terminal for the given period of time $T_2$, as shown in FIG. 5.

Figure 6:
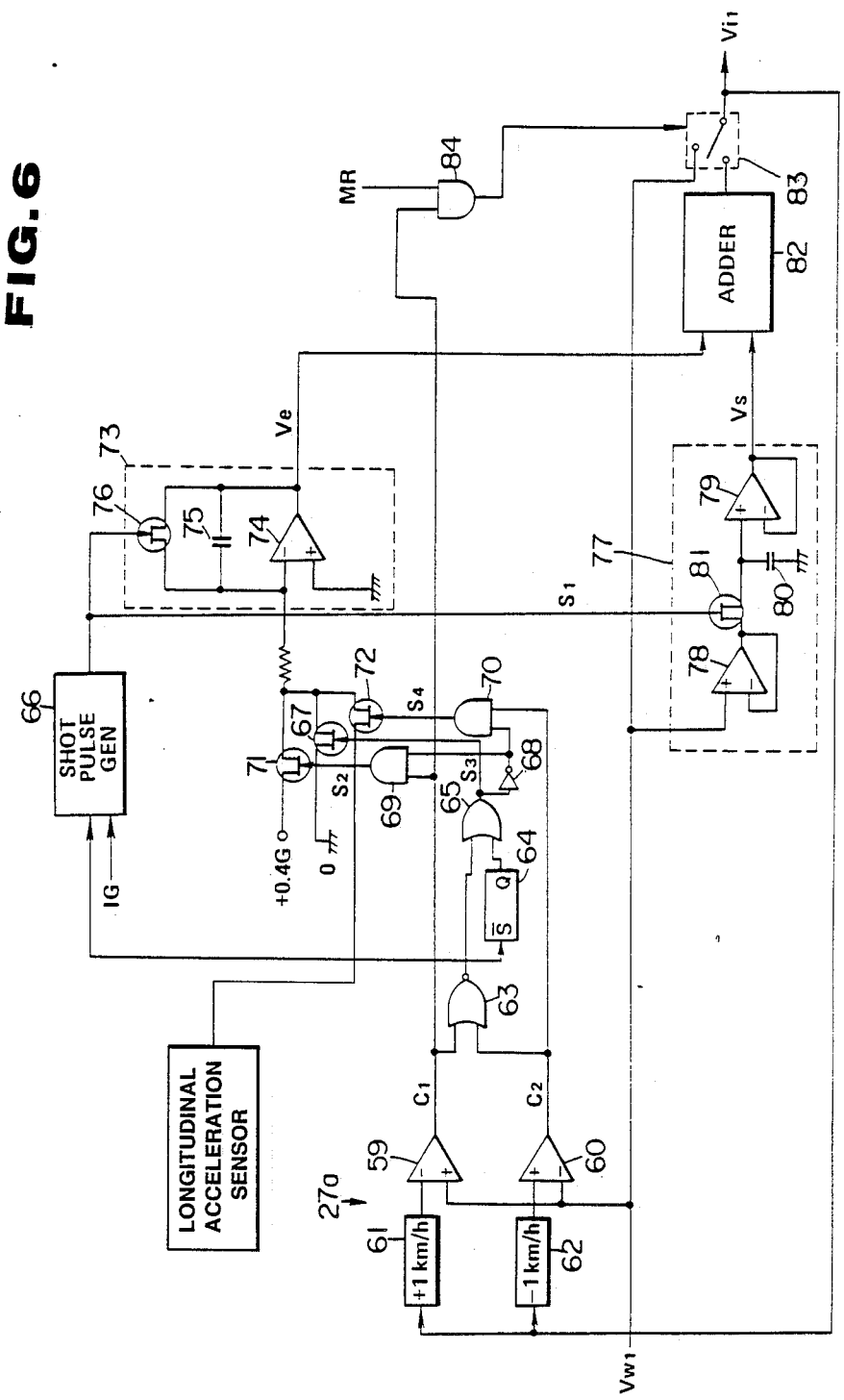
FIG. 6 is a block diagram of the preferred embodiment of the vehicle speed representing value derivation circuit in the anti-skid brake control system of FIG. 1.

FIG. 6 shows the detailed construction of the vehicle speed representing data derivation circuit 27a. As set forth above, the vehicle speed representing value derivation circuit 27a derives a vehicle speed representing value $Vi_1$ based on the wheel speed $Vw_1$ as indicated in the wheel speed signal from the wheel speed derivation circuit 31a. The vehicle speed representing value derivation circuit 27a includes comparators 59 and 60. The comparator 59 has a non-inverting input terminal connected to the wheel speed derivation circuit 31a. On the other hand, the comparator 60 is connected to the wheel speed derivation circuit 31a at an inverting input terminal. An inverting input terminal of the comparator 59 is connected to output terminal of the vehicle speed representing value derivation circuit 27a through which the vehicle speed representing value $Vi_1$ is output, through an adder 61. On the other hand, the non-inverting input terminal of the comparator 60 is connected to the output terminal of the vehicle speed representing value derivation circuit 27a through a subtractor 62. The adder 61 is designed to add a given value corresponding to 1 km/h of vehicle speed to the vehicle speed representing value $Vi_1$ for providing dead band of +1 km/h. The value as the sum of the vehicle speed representing value $Vi_1$ and the dead band value 1 km/h will be hereafter referred to as higher vehicle speed reference value. Similarly, the subtractor 62 subtracts a given value corresponding to 1 km/h of the vehicle speed from the vehicle speed representing value $Vi_1$ for providing dead band of −1 km/h. The value as the difference of the vehicle speed representing value $Vi_1$ and the dead band value −1 km/h will be hereafter referred to as lower vehicle speed reference value. The comparator 59 outputs HIGH level comparator signal when the wheel speed $Vw_1$ is higher than or equal to the higher vehicle speed reference value ($Vi_1$+1 km/h). In other words, the comparator signal level of the comparator 59 is held LOW as long as the wheel speed $Vw_1$ is maintained lower than the lower vehicle speed reference value ($Vi_1$+1 km/h). The comparator 60 outputs HIGH level comparator signal when the wheel speed $Vw_1$ is lower than to the lower vehicle speed reference value ($Vi_1$−1 km/h). In other words, the comparator signal level of the comparator 59 is held LOW as long as the wheel speed $Vw_1$ is maintained higher than or equal to the lower vehicle speed reference value ($Vi_1$−1 km/h).

The output terminals of the comparators 59 and 60 are connected to input terminals of NOR gate 63 to feed the comparator signals $c_1$ and $c_2$ thereto. The NOR gate 63 outputs HIGH level gate signal while signal levels of both of the comparator signals $c_1$ and $c_2$ are maintained LOW. Namely, the gate signal output from the NOR gate 63 is held LOW while the wheel speed $Vw_1$ is maintained higher than or equal to the vehicle speed representing value $Vi_1$−1 km/h and lower than the higher vehicle speed reference value ($Vi_1$+1 km/h). The gate signal of the NOR gate 63 is fed to a timer 64, an OR gate 65 and a shot-pulse generator 6, respectively. The timer 64 is responsive to the trailing edge of the HIGH level NOR gate signal to output a timer signal for a given period of time $T_3$, e.g. 0.1 sec. The timer signal is fed to the OR gate 65.

The OR gate 65 thus receives the the NOR gate signal at one input terminal and the timer signal from the timer 64 at the other input terminal. An OR gate signal of the OR gate 65 is transmitted to a gate of an analog switch 67 as a selector signal $S_3$. The output terminal of the OR gate 65 is also connected to one input terminal of an AND gates 69 and 70 via an inverter 68. The other input terminal of the AND gate 69 is connected to the output terminal of the comparator 59 to receive therefrom the comparator signal $c_1$. Similarly, the other input terminal of the AND gate 70 is connected to the output terminal of the comparator 60 to receive the comparator signal $c_2$ therefrom. Therefore, the gate signal $S_2$ of the AND gate 69 becomes HIGH while the comparator signal $c_1$ is maintained at HIGH level and the NOR gate signal is held LOW. The gate signal $S_2$ serves as a selector signal. On the other hand, the gate signal $S_4$ of the AND gate 70 becomes HIGH level while the comparator signal $c_2$ is maintained HIGH and the NOR gate signal is held LOW. This gate signal $S_4$ also serves as selector signal. The AND gates 69 and 70 are connected to gates of analog switches 71 and 72.

The analog switch 67 is turned ON in response to HIGH level selector signal $S_3$ to drop the supply voltage to an integrator circuit 73 to zero. On the other hand, the analog switch 71 is turned ON in response to the HIGH level selector signal $S_2$ to supply a voltage E corresponding to a possible maximum wheel acceleration, e.g. 0.4 G, to the integrator circuit 73.

The analog switch 72 is connected to a longitudinal acceleration dependent deceleration gradient generator circuit 100. The longitudinal acceleration dependent deceleration gradient generator circuit 100 is connected to the aforementioned longitudinal acceleration sensor 47 and comprises an absolute value circuit 91, an adder circuit 93, an offset value generator circuit 92 and an inverter circuit 90. The absolute value circuit 91 is directly connected to the longitudinal acceleration sensor 47 for receiving therefrom the longitudinal acceleration indicative sensor signal. As set forth, the longitudinal acceleration indicative sensor signal has a positive value when the longitudinal acceleration exerted on the vehicle body is backward acceleration causing vehicular deceleration and a negative value when the longitudinal acceleration exerted on the vehicle body is forward acceleration causing acceleration of the vehicle. Magnitude of the longitudinal acceleration indicative sensor signal is variable depending upon acceleration and deceleration acting on the vehicle body. Therefore, the absolute value output from the absolute value circuit 91 represents magnitude of longitudinal acceleration regardless the direction thereof. The output of the absolute value circuit 91 is fed to the adder circuit 93. The adder circuit 93 also receives an offset value indicative signal which represents offset value, e.g. 0.3 G. The offset value of the offset value generator circuit 91 is so selected as not to cause significant influence in derivation of the projected vehicular speed representative data Vi. In the adder circuit 93, the offset value of the offset value generator circuit 91 is added to the absolute value output of the absolute value generator circuit 91. Therefore, the output of the adder circuit 93 is offset from the output of the absolute value circuit 91 in a magnitude corresponding to the offset value of the offset value generator circuit 92. The output of the adder circuit 93 is fed to the inverter circuit 90. The inverter circuit 90 inverts the received adder output to produce the deceleration gradient indicative data −m on the basis of the received adder output.

The analog switch 72 will be likewise turned ON in response to the HIGH level selector signal $S_4$ to supply a voltage corresponding to possible minimum wheel acceleration value.

The integrator circuit 73 has a per se well known construction and is consisted of an amplifier 74, a capacitor 75 and an analog switch 76. The gate of the analog switch 76 is connected to the shot-pulse generator 66 to receive therefrom a shot-pulse which serves as a reset signal $S_1$. The integrator 73 is reset by the HIGH level reset signal $S_1$ and is responsive to the trailing edge of the HIGH level reset signal to reset the integrated value. The integrator circuit 73 integrates the supply voltage E after termination of the HIGH level reset signal $S_1$ to output the integrator signal. The shot-pulse generator 66 is responsive to an ON-set signal IG of an ignition switch to generate a first shot pulse as the first reset signal for resetting the integrator circuit 73. The shot-pulse generator 66 subsequently generate the shot-pulses serving as the reset signal $S_1$ at every leading edge of the HIGH level NOR gate signal. As set forth above, since the NOR gate signal becomes HIGH when the wheel speed $Vw_1$ satisfies $(Vi_1−1\ km/h) \leq Vw_1 < (−Vi_1+1\ km/h)$, the integrated value of the integrator 73 is reset every occurrence of the wheel speed $Vw_1$ in the aforementioned range. The reset signal $S_1$ of the shot-pulse generator 66 is also supplied to a sample hold circuit 77. The sample hold circuit 77 comprises a buffer amplifiers 78 and 79, a capacitor 80 and an analog switch 81. The analog switch 81 is connected to the shot-pulse generator 66 to receive the reset signal $S_1$ at the gate thereof to be turned ON. The sample hold circuit 77 is responsive to turning ON of the analog switch 81 to reset the held wheel speed value. The sample hold circuit 77 in absence of the reset signal $S_1$ from the shot-pulse generator 66, samples and holds the instantaneous wheel speed value $Vw_1$ at the occurrence of the reset signal as a sample value Vs. The sample hold circuit 77 outputs a sample/hold signal having a value indicative of the sample value Vs to an adder 82. The adder receives the sample/hold signal from the sample hold circuit 77 and integrator signal from the integrator 73. As will be appreciated, the integrator signal has a value indicative of an integrated value Ve $$\left( = \int_0^t (-E) \cdot dt \right).$$

Therefore, the adder 82 adds the integrated value Ve to the sample value Vs to derive the vehicle speed representing value $Vi_1$. The output terminal of the adder 82 is connected to a switching circuit 83. The switching circuit 83 is also directly connected to the wheel speed derivation circuit 31a to be input the wheel speed signal. On the other hand, the switching circuit 83 also connected to an AND gate 84. The AND gate 84 has one input terminal connected to a retriggerable timer 30 to receive therefrom the pump drive signal MR. The other input terminal of the AND gate 84 is connected to the output terminal of the comparator 59. The AND gate 84 controls the switch position of the switching circuit 83 to selectively connect the wheel speed derivation circuit 31a or the adder 82 to the output terminal of the vehicle speed representing value derivation circuit 27a.

Namely, the gate signal of the AND gate is normally maintained LOW level due to absence of the HIGH level pump drive signal MR. The gate signal of the AND gate is also held LOW level while the wheel acceleration is negative or that the wheel speed $Vw_1$ is lower than the $Vi_1+1$ km/h value as compared in the comparator 59. While the gate signal is held LOW, the switching circuit 82 is held at a first switch position where the adder 82 is connected to the output terminal of the vehicle speed representing value derivation circuit therethrough. On the other hand, when the HIGH level pump drive signal MR and the HIGH level comparator signal of the comparator 59 are both input to the AND gate, the gate signal of the AND gate 84 turns HIGH to switch the switching circuit 83 to a second switch position where the wheel speed derivation circuit 31a is directly connected to the output terminal of the vehicle speed representing value derivation circuit 27a.

Figure 7:
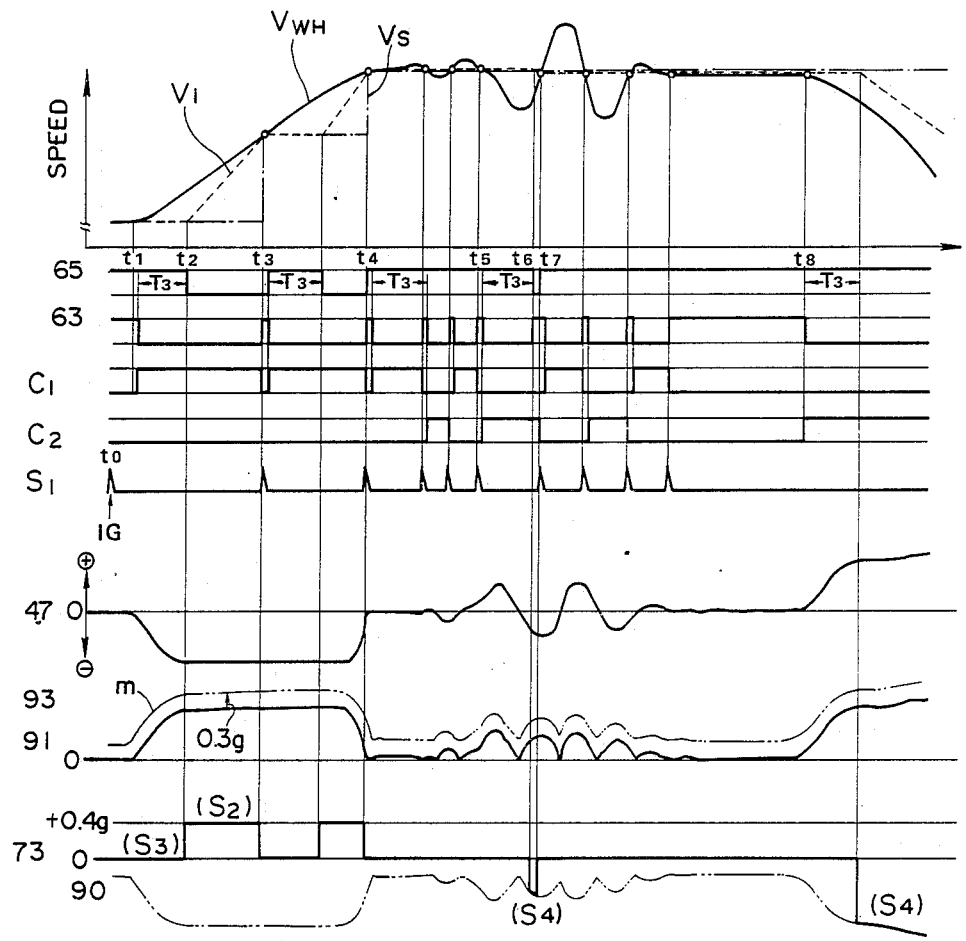
FIG. 7 is a timing chart showing operation of the vehicle speed representing value derivation circuit of FIG. 6.

Operation of the vehicle speed representing derivation circuit 27a will be described herebelow with reference to FIG. 7. In FIG. 7, the operation of the vehicle speed representing value derivation circuit 27a is described in a condition where the gate signal level of the AND gate 84 is maintained LOW level due to absence of the HIGH level pump signal MR or the comparator signal $c_1$ from the comparator 59 is held LOW. At this condition, by the LOW level gate signal of the AND gate 84, the switching circuit 83 is switched at a switch position where the adder 82 is connected to the output terminal of the vehicle speed representing value derivation circuit.

In the process of FIG. 7, the engine is started up at a time $t_0$. In response thereto, the On-set signal IG is input to the shot-pulse generator 66. Therefore, the shot pulse $s_1$ is output at the time $t_0$ from the shot-pulse generator 66. With the shot pulse at the time $t_0$, the sample hold circuit 77 is reset. The sample/hold circuit 77 as reset by the shot pulse $s_1$ at the time $t_0$, samples and holds the wheel speed signal value $Vw_1$ as sample value $Vs$. Therefore, after the time $t_0$, the held sample value $Vs$ is output from the sample hold circuit 77 as an initial vehicle speed representing value. At the same time, i.e. at the time $t_0$, the integrator circuit 73 is reset by the reset signal $S_1$. Therefore, the value $Ve$ of the integrator signal of the integrator circuit 73 drops to zero. As a result, the output value $Vi_1$ from the adder 82 becomes that equal to the held initial vehicle speed representing value $Vs$, as shown by broken line in FIG. 7.

At this time, the comparator signals $c_1$ and $c_2$ of the comparators 59 and 60 are maintained LOW level. Therefore, the NOR gate signal of the NOR gate 63 is maintained HIGH ievel. Therefore, the gate signal level of the OR gate 65 is maintained HIGH level and the gate signal is fed to the analog switch 67 as the select signal $S_3$. Therefore, the analog switch 67 is turned ON by the HIGH level gate signal from the OR gate 65. On the other hand, the HIGH level gate signal of the OR gate 65 is fed to the AND gates 69 and 70 through the inverter 68. Therefore, the select signals $S_2$ and $S_4$ of the AND gates 69 and 70 are held LOW to maintain the analog switches 71 and 72 at OFF position. Since the analog switch 67 serves to maintain the input level at the inverting input terminal of the comparator 74 in the integrator circuit 73 zero, the integrated value of the integrator circuit 73 is maintained zero. As a consequence, the output value of the adder 82 as the vehicle speed representing value $Vi$ is maintained at the equal value to the initial vehicle speed representing value as the sample value $Vs$.

After the vehicle start running, the wheel speed $Vw$ becomes greater than or equal to $Vi_1 + 1$ km/h, at a time $t_1$. In response to this, the comparator signal of the comparator 59 turns HIGH level. By the HIGH level comparator signal $c_1$ from the comparator 59, the gate signal of the NOR gate 63 turns LOW. At this time, since the timer 64 becomes active to output HIGH level timer signal for a period of time $T_3$, the gate signal level of the OR gate 65 is maintained HIGH level for the corresponding $T_3$ period. Therefore, the select signal $S_3$ is maintained HIGH level and the selector signals $S_2$ and $S_4$ are held at LOW level. Therefore, even after the vehicle start running the vehicle speed representing value $Vi_1$ is held at the equal value to the sample value $Vs$ for the $T_3$ period.

After expiration of the $T_3$ period, at a time $t_2$, the gate signal of the OR gate 65 turned into LOW level due to termination of the HIGH level timer signal from the timer 64. Since the comparator signal $c_1$ and the inverted gate signal from the OR gate 65 through the inverter 68 are both becomes HIGH level, the selector signal $S_2$ of the AND gate 69 turns HIGH. At the same time, because of LOW level gate signal of the OR gate 65 is applied to the gate of the analog switch 67 as the select signal $S_3$ to turn the latter OFF. At this time, since the comparator signal from the comparator 60 is maintained LOW level, the AND gate 70 is maintained non-conductive to feed the LOW level select signal $S_4$. Therefore, only analog switch 71 is turned ON to input a value E from an acceleration gradient indicative value generator circuit 85. As seen from FIG. 6, the acceleration gradient indicative value generator circuit 85 has an internal switch which selects 0.4 G while anti-skid control is not active and selects 10 G while anti-skid control is active. In order to select one of the aforementioned acceleration gradient indicative value, the acceleration gradient indicative value generator circuit 85 is connected to the retriggerable timer 30 receive therefrom the MR signal. Namely, when the MR signal is held LOW level which means that anti-skid control is not active, the internal switch of the acceleration gradient indicative value generator circuit 85 selects 0.4 G. On the other hand, when the MR signal is HIGH, the internal switch is switched to select 10 G. By selecting greater acceleration gradient indicative value while the anti-skid control is active, increase rate of the projected vehicular speed representative data $Vi$ becomes greater to provide quicker resumption of the vehicular speed. This may provide higher response in anti-skid control.

Assuming the anti-skid control is not active at the time $t_2$, the acceleration gradient indicative value corresponding to wheel acceleration magnitude of 0.4 G is selected and fed to the integrator circuit 73 as the input voltage E. This value, e.g. 0.4 G serves for defining gradient or inclination of the vehicle speed representing value $Vi_1$. The integrator circuit 73 thus receives the value (0.4 G) through the analog switch 71 to output the integrator signal having a value $Ve$ as set forth above. Therefore, the output value of the adder 82 increases from time-to-time as increasing of the integrator signal value $Ve$.

At a time $t_3$, the vehicle speed representing value $Vi_1$ ($=Vs+Ve$) reaches a value to establish $Vw_1 < Vi_1 + 1$ km/h. Then, the comparator signal $c_1$ turns into LOW level. Therefore, the gate signal level of the NOR gate 63 again turns into HIGH level. The shot-pulse generator 66 is triggered by the leading edge of the HIGH level gate signal of the NOR gate to output the shot pulse serving as the reset pulse $S_1$. Therefore, the sample hold circuit 77 and the integrator circuit 73 are reset. At the same time, the instantaneous wheel speed $Vw_1$ at the time $t_3$ is sampled and held in the sample hold circuit 77 as the renewed sample value $Vs$. By renewing the sample value $Vs$, the vehicle speed representing value $Vi_1$ becomes equal to the instantaneous wheel speed value $Vw_1$ and thus establishes $Vw_1 \geq Vi+1$ km/h. Therefore, the comparator signal $c_1$ again turns ON at the time $t_3$. Similarly to the control behavior at the period from $t_1$ to $t_3$, the gate signal of the OR gate 65 is held HIGH for the $T_3$ period by HIGH level timer signal of the timer 64. Similarly, at the time $t_4$, the shot-pulse generator 66 is triggered to output the reset signal $S_1$ to renew the sample value $Vs$ by the instantaneous wheel speed $Vi_1$ at the time $t_4$. After the time $t_4$, the sampled value $Vs$ is maintained constant for the given period $T_3$ by the HIGH level timer signal of the timer 64. Before the HIGH level timer signal terminates, the shot pulse as the reset signal is generated by the shot pulse generator 66, as shown in FIG. 7. While the interval of the shot pulse of the shot pulse generator 66 is shorter than the timer period $T_3$, the integrated value of the integrator 73 is maintained zero. Therefore, the adder outputs the sampled value $Vs$ as the vehicle speed representing value $Vi_1$.

After a time $t_5$, at which the reset signal $s_1$ is produced for resetting the sample hold circuit 77 and the intergrator 73, the gate signal of the OR gate turns LOW at a time $t_6$ after expiration of the timer period $T_3$. During the period between the times $t_5$ and $t_6$, the wheel speed $Vw_1$ drops to be lower than ($Vi_1 - 1$ km/h). Since the wheel speed $Vw_1$ is maintained lower than the value $(Vi_1-1$ km/h) at the time $t_6$, the comparator signal $c_1$ of the comparator 59 is maintained LOW and the comparator signal $c_2$ of the comparator 60 is maintained HIGH. Therefore, the analog switch 71 is held OFF and the analog switch 72 is turned ON. Therefore, the integrator 73 is connected to the inverter circuit 90 of the deceleration gradient indicative value generator circuit 100 to receive the deceleration gradient indicative value $-m$.

As seen from FIG. 7, the longitudinal acceleration indicative sensor signal value varies to have negative value while the vehicle is accelerating and positive value while the vehicle is decelerating. The longitudinal acceleration indicative sensor signal value is converted into positive value by the absolute value circuit 91 and output to the inverter circuit 90 with a given offset, e.g. 0.3 G, via the adder circuit 93. Therefore, the output of the inverter circuit 90 reflects the input value m from the adder circuit 93, which includes longitudinal acceleration dependent component and offset component. Consequently, the integrated value Ve in the integrator 73 is decreased and becomes negative. The negative integrated value Ve is summed with the sample value Vs which corresponds to the instantaneous wheel speed $Vw_1$ at a time $t_5$ to gradually reduce the value of the vehicle speed representing value $Vi_1$. At a time $t_7$, the wheel speed $Vw_1$ is increased across the value $(Vi_1+1$ km/h). As a result, the reset signal $s_1$ is generated by the shot pulse generator 66. Then sample hold circuit 77 and the integrator 73 are thus reset.

At a time $t_8$, braking operation is initiated to abruptly decelerate the vehicle. As a result, the wheel speed $Vw_1$ drops across the value of $(Vi_1-1$ km/h). By this, the comparator signal $c_2$ of the comparator rises to HIGH level to destroy the NOR condition at the NOR gate 63. Therefore, the NOR gate signal of the NOR gate turns into LOW level. The timer 64 is thus triggered by the trailing edge of the HIGH level NOR gate signal to output HIGH level timer signal for the timer period $T_3$. After expiration of the timer period $T_3$, the value corresponding to the deceleration magnitude of $-1.2$ G is input to the integrator. Therefore, the vehicle speed representing value $Vi_1$ is gradually decreased.

Figure 8:
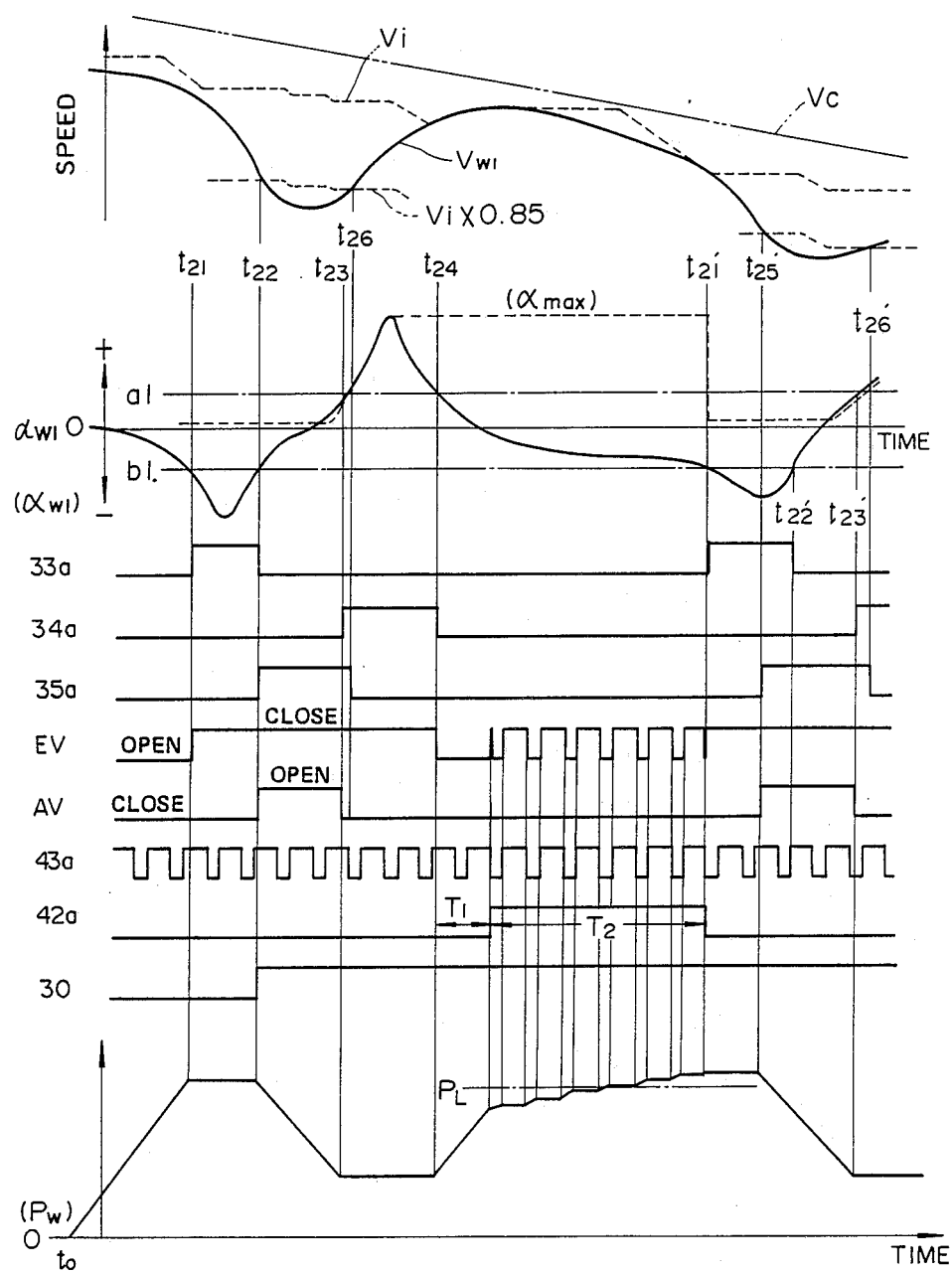
FIG. 8 is a timing chart showing operation of the anti-skid brake control to be performed by the anti-skid brake control system of FIG. 1 for controlling braking pressure for rear wheels.

FIG. 8 shows a timing chart of the operation of the controller circuit section 18a in anti-skid brake control for the rear wheels.

It is assumed that vehicular brake is applied for deceleration of the vehicle at a time $t_{10}$, hydraulic braking pressure is built up and distributed to all of the wheel cylinders 1a, 2a, 3a and 4a in common. According to increasing of the braking pressure in the wheel cylinder 1a, the right-front wheel 1 is decelerated.

At a time $t_{11}$, the wheel acceleration $aw_1$ decreases across the wheel deceleration threshold $-b$. This results in initiation of anti-skid brake control. Namely, since the wheel acceleration $aw_1$ becomes smaller than the wheel deceleration threshold $-b$, the comparator signal of the comparator 33a turns into HIGH level. This turns the gate signals of the OR gates 36a, 40a into HIGH level. Therefore, the inlet control signal $EV_1$ output through the amplifier 37a turns HIGH level. Therefore, both of the EV valve 19a is shut at the time $t_{11}$. At this time. since the output of the AND gate 38a is held LOW level, the outlet control signal $AV_1$ is held LOW. Therefore, the AV valve 20a is also maintained at closed position. Therefore, the anti-skid brake control valve assembly 17a is placed in HOLD mode position. The braking pressure in the right-front wheel cylinder 1a is thus held constant at the pressure level at the time $t_{11}$.

For the initial cycle of the anti-skid brake control, the vehicle speed representing value Vi is derived by the vehicle speed representing value derivation system 27. Based on the common vehicle speed representing value Vi, the target wheel speed $V\lambda_1$ is derived at a value 85% of Vi. As described above, since the vehicle speed representing value decreases according to the integrated value of the integrator 73, the target wheel speed $V\lambda_1$ decreases continuously. At a time $t_{12}$, the common wheel speed $Vw_1$ decelerated across the target wheel speed $V\lambda_1$. Then, the comparator signal of the comparator 35a turns into HIGH level. At this time, since the comparator signal of the comparator 34a is held LOW to apply HIGH level input to the AND gate 38a through the inverting input terminal, AND condition is established at the AND gate 38a. Therefore, the gate signal of the AND gate 38a turns into HIGH level to cause HIGH level outlet control signal $AV_1$. This operates the anti-skid brake control valve assembly 17a into the RELEASE mode position. Therefore, the braking pressure in the wheel cylinder 1a is released by feeding back the pressurized braking fluid to the pressure accumulator 22a. At the same time, by the HIGH level outlet control signal $Av_1$, the retriggerable timer 30 is triggered to start outputting of the pump drive signal MR. Therefore, the pump motor 24 is start driving to drive the fluid pump 21a.

By decreasing the braking pressure in the wheel cylinder 1a, the wheel speed $Vw_1$ are resumed and therefore wheel acceleration $aw_1$ is increased. The wheel acceleration $aw_1$ increases across the wheel deceleration threshold $-b$ at a time $t_{13}$. Therefore, the comparator signal of the comparator 33a turns into LOW level at the time $t_{13}$. However, at this time, since the HIGH level comparator signal is input to the OR gate 36 is maintained HIGH level. Therefore, the gate signal of the OR gate 40a is held HIGH to maintain the inlet control signal $EV_1$ at HIGH level. Therefore, the anti-skid control valve assembly 17a is maintained at the RELEASE mode, at the time $t_{13}$. Thus, the wheel speeds $Vw_1$ are continued to increase. Accordingly, the wheel acceleration $aw_1$ increases. At a time $t_{14}$, the wheel acceleration $aw_1$ increases across the wheel acceleration threshold $+a$. This results in HIGH level comparator signal of the comparator 34a. This HIGH level comparator signal of the comparator 34a turns the input level at the inverting input terminal of the AND gate 38a into LOW level. Therefore, the AND gate signal of the AND gate 38a turns into LOW level. Therefore, the outlet control signal $AV_1$ turns into LOW level to close the Av valve 20a in the anti-skid brake control valve assembly 17a. As a result, the anti-skid brake control valve assembly 17a is again placed into the HOLD mode to maintain the braking pressure level constant at the pressure level at the time $t_{14}$. By holding the braking pressure at decreased level, the wheel speed $Vw_1$ still increases. Also, according to increasing of the wheel speed, wheel acceleration $aw_1$ increases toward the peak $aw_{max}$. As seen from FIG. 8, the rear wheel speed $Vw_1$ increases across the target wheel speed $V\lambda_1$ at a time $t_{15}$. This results in LOW level comparator signal of the comparator 35a. After this, at a time $t_{16}$, the wheel acceleration $aw_1$ drops across the wheel acceleration threshold $+a$. In response to drop of the wheel acceleration $aw_1$ across the wheel acceleration threshold +a, the comparator signal of the comparator 34a turns into LOW level. Therefore, the all of the inputs to the OR gate 36a becomes LOW level. Therefore, the OR gate signal of the OR gate 36a turns into LOW level to cause LOW level inlet control signal $EV_1$ at the time $t_{16}$. At the same time, the variable timer 42a is activated by the trailing edge of the HIGH level comparator signal of the comparator 34a to output HIGH level timer signal for a period $T_2$ after a delay time $T_1$ which is variable depending upon the wheel acceleration peak value as latched by the peak hold circuit 44a. During the period $T_2$, the oscillator 43a is triggered to output constant pulse signals. As will be appreciated, while the pulse signal is maintained ON (HIGH) level, AND conditions are established in the AND gate 41a to maintain the inlet control signal $EV_1$ at HIGH level. Therefore, during the delay time $T_1$, the anti-skid brake control valve 17a is held in APPLICATION mode to increase the braking pressure. On the other hand, during the period $T_2$, the operation mode of the anti-skid brake control valve 17a are alternated between APPLICATION mode and HOLD mode repeatedly.

At a time $t_{17}$, the wheel acceleration $\alpha w_1$ drops across the wheel deceleration threshold $-b$. Therefore, another cycle of anti-skid brake control is initiated. At the same time, the peak hold circuit 44a is reset by the leading edge of the HIGH level comparator signal of the comparator 33a. Thereafter, one skid cycle of anti-skid brake control operation is performed during the period $t_{17}$ to $t_{22}$.

As will be appreciated herefrom, the anti-skid brake control to be taken place for releasing the braking pressure in both of the rear wheel cylinders in response to decreasing of the common wheel speed Vw across the target wheel speed $V\lambda_1$ in synchronism with each other and at the same rate. On the other hand, in the APPLICATION mode, the braking pressures in the wheel cylinders are built up at different rate to each other. As a result, when one of the wheel is decelerated across the target wheel speed, the other wheel is rotating at higher speed than the target wheel speed. Therefore, it is successfully avoided to cause locking of both wheels at the same time. This assures derivation of the vehicle speed representing value $Vi_1$ at the value precisely reflecting the vehicle speed to allow precise control for the brake.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, various circuit components can be modified or replaced with the equivalent components. For example, the technologies of derivation of the projected vehicular speed representative data may be applicable for the anti-skid brake control systems disclosed in the following co-pending U.S. applications, all of which are commonly assigned to the assignee of the present invention:

U.S. patent application Ser. No. 945,565, filed on Dec. 23, 1986

U.S. patent application Ser. No. 945,559, filed on Dec. 23, 1986, corresponding German patent application has been published under First Publication No. 36 44 324

U.S. patent application Ser. No. 945,562, filed on Dec. 23, 1986, corresponding German patent application has been published under First Publication No. 36 44 325 and U.S. patent application Ser. No. 945,715, filed on Dec. 23, 1986, corresponding German patent application has been published under First Publication No. 36 44 221.

The disclosures of the above-identified co-pending U.S. patent applications and the German counterparts are herein incorporated by reference.

Furthermore, though the shown embodiment is concentrated to the anti-skid brake control system, the technologies of deriving the projected vehicular speed on the basis of the wheel speed, may be applicable for other control systems, such as slip control, traction control, driving torque control and so forth. For example, the derivation of the projected vehicular speed representative value in the present invention may also be applicable for the following co-pending U.S. patent applications, all of which have been assigned to the common assignee to the present invention:

U.S. patent application Ser. No. 918,125, filed on Oct. 14, 1986, corresponding German patent application has been published under First Publication No. 36 34 627

U.S. patent application Ser. No. 918,137, filed on Oct. 14, 1986

U.S. patent application Ser. No. 918,080, filed on Oct. 14, 1986 and

U.S. patent application Ser. No. 918,081, filed on Oct. 14, 1986.

The disclosures of the above-identified co-pending U.S. patent applications and the German counterparts are herein incorporated by reference.

What is claimed is:

1. An anti-skid brake control system for an automotive brake system comprising:
   a hydraulic brake circuit comprising means for building up braking fluid pressure according to operational magnitude of a manually operable braking member and braking force generating means associated with a vehicular wheel for generating a braking force to decelerate said vehicular wheel;
   pressure adjusting means, disposed within said hydraulic circuit, for adjusting pressure of a working fluid to be delivered to said braking force generating means, said pressure adjusting means being operable at least in a first mode for increasing braking pressure in said braking force generating means and in a second mode for decreasing said braking pressure in said braking force generating means;
   first sensor means for monitoring rotation speed of said vehicular wheel to produce a wheel speed indicative sensor signal value representative of rotation speed of said vehicular wheel;
   second sensor means for monitoring longitudinal acceleration exerted on a vehicular body by producing a longitudinal acceleration indicative sensor signal value;
   first means for detecting a predetermined vehicular braking condition satisfying a predetermined anti-skid brake control condition for initiating anti-skid control operation;
   second means for latching a first wheel speed indicative value corresponding to said wheel speed indicative sensor signal value at a predetermined timing in each skid cycle and for arithmetically deriving a vehicular deceleration indicative datum on the basis of said longitudinal acceleration indicative sensor signal value, and for driving a gradient of vehicular speed during vehicular deceleration on the basis of said longitudinal acceleration indicative sensor signal value;

third means for deriving a projected vehicular speed representative datum based on said first wheel speed indicative value and utilizing said gradient of vehicular speed; and fourth means for controlling said pressure adjusting means between said first and second modes for maintaining said rotation speed of said vehicular wheel in a predetermined optimal relationship with said projected vehicular speed representative datum.

2. An anti-skid brake control system as set forth in claim 1, wherein said second means derives said vehicular deceleration indicative datum by adding a given magnitude of offset value to said longitudinal acceleration indicative sensor signal value.

3. An anti-skid brake control system as set forth in claim 1, wherein said second means includes integrator means for integrating a given vehicular acceleration indicative datum while said vehicular body is in acceleration and said vehicular deceleration indicative datum while said vehicular body is in deceleration resulting in an integrated value, and for deriving said projected vehicular speed indicative datum by adding said integrated value to said first wheel speed indicative value.

4. An anti-skid brake control system as set forth in claim 3, wherein said second means includes comparator means comparing said wheel speed indicative sensor signal value with a reference value, said reference value being derived on the basis of said projected vehicular speed representative datum for discriminating a vehicular condition between acceleration state and deceleration state in order to select between said vehicular acceleration indicative datum or said vehicular deceleration indicative datum.

5. An anti-skid brake control system as set forth in claim 4, wherein said comparator means establishes said reference value with a first greater value component derived by adding a given value to said projected vehicular speed indicative datum, said first greater value component serves as acceleration state criterion to indicate that said vehicular body is in said vehicular acceleration state when said wheel speed indicative sensor signal value is greater than said first greater value component, and a second smaller value component derived by subtracting said given value from said projected vehicular speed indicative datum, said second smaller value component serves as a deceleration state criterion to indicate that said vehicular body is in said deceleration state when said wheel speed indicative sensor signal value is smaller than said second smaller value component, in order to define a deadband around said projected vehicular speed indicative data, said acceleration or deceleration indicative datum is maintained at zero in said deadband.

6. An anti-skid brake control system as set forth in claim 3, wherein said vehicular acceleration indicative datum comprises a first value to be used while an anti-skid control is not active and a second value greater than said first value to be used while said anti-skid control is active.

7. An anti-skid brake control system for an automotive brake system comprising:

a hydraulic brake circuit comprising means for building up braking fluid pressure according to operational magnitude of a manually operable braking member, first braking force generating means, associated with a first vehicular wheel, for generating braking force to decelerate said first vehicular wheel, and second braking force generating means, associated with a second vehicular wheel, for generating braking force to decelerating said second vehicular wheel;

first pressure adjusting means, disposed within said hydraulic circuit, for adjusting pressure of a working fluid to be delivered to said first braking force generating means, said first pressure adjusting means being operable at least in a first mode for increasing braking pressure in said first braking force generating means and in a second mode for decreasing braking pressure in said first braking force generating means;

second pressure adjusting means disposed within said hydraulic circuit, for adjusting pressure of a working fluid to be delivered to said second braking force generating means, said second pressure adjusting means being operable at least in a first mode for increasing braking pressure in said second braking force generating means and in a second mode for decreasing braking pressure in said second braking force generating means;

first sensor means for monitoring rotation speed of said first vehicular wheel to produce a first wheel speed indicative sensor signal value representative of rotation speed of said first vehicular wheel;

second sensor means for monitoring rotation speed of said second vehicular wheel to produce a second wheel speed indicative sensor signal value representative of rotation speed of said second vehicular wheel;

means for comparing said first and second wheel speed indicative sensor signal values, and for selecting one having greater value as a common wheel speed indicative sensor signal value;

third sensor means for monitoring longitudinal acceleration exerted on a vehicular body by producing a longitudinal acceleration indicative sensor signal value;

first means for detecting a predetermined vehicular braking condition satisfying a predetermined anti-skid brake control condition for initiating anti-skid control operation;

second means for latching a wheel speed indicative datum corresponding to said common wheel speed indicative sensor signal value at a predetermined timing in each skid cycle and for arithmetically deriving a vehicular deceleration indicative datum on the basis of said longitudinal acceleration indicative sensor signal value, and for deriving a gradient of vehicular speed during vehicular deceleration on the basis of said longitudinal acceleration indicative sensor signal value;

third means for deriving a projected vehicular speed representative datum based on said first wheel speed indicative datum and utilizing said gradient of vehicular speed; and fourth means for controlling said first and second pressure adjusting means between said first and second modes for maintaining said rotation speeds of said first and second vehicular wheels in a predetermined optimal relationship with said projected vehicular speed representative datum.

8. An anti-skid brake control system as set forth in claim 7, wherein said second means derives said vehicular deceleration indicative datum by adding a given magnitude of offset value to said longitudinal acceleration indicative sensor signal value.

9. An anti-skid brake control system as set forth in claim 7, wherein said second means includes integrator means for integrating a given vehicular acceleration indicative datum while said vehicular body is in acceleration and said vehicular deceleration indicative datum while said vehicular body is in deceleration resulting in an integrated value, and for deriving said projected vehicular speed indicative datum by adding said integrated value to said first wheel speed indicative datum.

10. An anti-skid brake control system as set forth in claim 9, wherein said second means includes comparator means comparing said wheel speed indicative sensor signal value with a reference value, said reference value being derived on the basis of said projected vehicular speed representative datum for discriminating vehicular condition between acceleration state and deceleration state in order to select said vehicular acceleration indicative datum or said vehicular deceleration indicative datum.

11. An anti-skid brake control system as set forth in claim 10, wherein said comparator means establishes said reference value with a first greater value component derived by adding a given value to said projected vehicular speed indicative datum, said first greater value component serves as acceleration state criterion to indicate that said vehicular body is in said acceleration state when said common wheel speed indicative sensor signal value is greater than said first greater value component, and a second smaller value component derived by subtracting said given value from said projected vehicular speed indicative datum, said second smaller value component serves as a deceleration state criterion to indicate that said vehicular body is in said deceleration state when said common wheel speed indicative sensor signal value is smaller than said second smaller value component, so as to define a deadband around said projected vehicular speed indicative datum, said vehicular acceleration or deceleration indicative datum is maintained at zero in said deadband.

12. An anti-skid brake control system as set forth in claim 9, wherein said vehicular acceleration indicative datum comprises a first value to be used while an anti-skid control is not active and a second value greater than said first value to be used while said anti-skid control is active.

13. A system for projecting vehicular speed representative data on the basis of a wheel speed, comprising:
first sensor means for monitoring rotation speed of a vehicular wheel to produce a wheel speed indicative sensor signal value representative of rotation speed of said vehicular wheel;
second sensor means for monitoring longitudinal acceleration exerted on a vehicular body for producing a longitudinal acceleration indicative sensor signal value;
first means for latching a first wheel speed indicative value corresponding to said wheel speed indicative sensor signal value at a predetermined timing and for arithmetically deriving a vehicular deceleration indicative datum or the basis of said longitudinal acceleration indicative sensor signal value and for deriving a gradient of vehicular speed during vehicular deceleration on the basis of said longitudinal acceleration indicative sensor signal value; and
third means for deriving a projected vehicular speed representative datum based on said first wheel speed indicative value and utilizing said gradient of vehicular speed.

14. A system as set forth in claim 13, wherein said first means derives said vehicular deceleration indicative datum by adding a given magnitude of offset value to said longitudinal acceleration indicative sensor signal value.

15. A system as set forth in claim 13, wherein said second means includes integrator means for integrating a given vehicular acceleration indicative datum while said vehicular body is in acceleration and said deceleration indicative datum while said vehicular body is in deceleration resulting in an integrated value, and for deriving said projected vehicular speed indicative datum by adding said integrated value to said first wheel speed indicative value.

16. A system as set forth in claim 15, wherein said second means includes comparator means comparing said wheel speed indicative sensor signal value with a reference value said reference value being derived on the basis of said projected vehicular speed representative datum for discriminating vehicular condition between acceleration state and deceleration state to select said vehicular acceleration indicative datum and said vehicular deceleration indicative datum.

17. A system as set forth in claim 16, wherein said comparator means establishes said reference value with a first greater value component derived by adding a given value to said projected vehicular speed indicative datum, said first greater value component serves as acceleration state criterion to indicate that said vehicular body is in said acceleration state when said common wheel speed indicative sensor signal value is greater than said first greater value component, and a second smaller value component derived by subtracting said given value from said projected vehicular speed indicative datum, said second smaller value component serves as a deceleration state criterion to indicate that said vehicular body is in said deceleration state when said common wheel speed indicative sensor signal value is smaller than said second smaller value component, so as to define a deadband around said projected vehicular speed indicative datum said vehicular acceleration or deceleration indicative datum is maintained at zero in said deadband.

18. A system as set forth in claim 15, wherein said vehicular acceleration indicative datum comprises a first value to be used while an anti-skid control is not active and a second value greater than said first value to be used while said anti-skid control is active.

* * * * *